United States Patent
Watanabe et al.

(10) Patent No.: US 12,183,921 B2
(45) Date of Patent: Dec. 31, 2024

(54) LI—NI COMPOSITE OXIDE PARTICLES AND NON-AQUEOUS ELECTROLYTE SECONDARY BATTERY

(71) Applicant: TODA KOGYO CORP., Hiroshima (JP)

(72) Inventors: Hiroyasu Watanabe, Battle Creek, MI (US); Xiang Sun, Battle Creek, MI (US); Mitchell Fetterer, Battle Creek, MI (US)

(73) Assignee: TODA KOGYO CORP., Hiroshima (JP)

( * ) Notice: Subject to any disclaimer, the term of this patent is extended or adjusted under 35 U.S.C. 154(b) by 898 days.

(21) Appl. No.: 16/975,280

(22) PCT Filed: Mar. 1, 2019

(86) PCT No.: PCT/JP2019/008127
§ 371 (c)(1),
(2) Date: Aug. 24, 2020

(87) PCT Pub. No.: WO2019/168160
PCT Pub. Date: Sep. 6, 2019

(65) Prior Publication Data
US 2020/0403241 A1 Dec. 24, 2020

Related U.S. Application Data

(60) Provisional application No. 62/637,449, filed on Mar. 2, 2018.

(51) Int. Cl.
*H01M 4/525* (2010.01)
*C01G 53/00* (2006.01)
(Continued)

(52) U.S. Cl.
CPC ............ *H01M 4/525* (2013.01); *C01G 53/42* (2013.01); *H01M 4/366* (2013.01); *H01M 4/62* (2013.01);
(Continued)

(58) Field of Classification Search
CPC ........ H01M 4/525; H01M 4/366; H01M 4/62; H01M 10/0525; H01M 2004/021;
(Continued)

(56) References Cited

U.S. PATENT DOCUMENTS

| | | | | |
|---|---|---|---|---|
| 8,623,551 B2 * | 1/2014 | Kawahashi | ............ | C01G 53/50 429/223 |
| 8,986,571 B2 * | 3/2015 | Watanabe | ............. | H01M 4/505 429/223 |

(Continued)

FOREIGN PATENT DOCUMENTS

| | | |
|---|---|---|
| EP | 3 652 113 A1 | 5/2020 |
| JP | H10188986 | 7/1998 |

(Continued)

OTHER PUBLICATIONS

The Royal Soceity: Cation-disordered rocksalt transition metal oxides and oxyfluorides for high energy lithium-ion cathodes (Year: 2020).*

(Continued)

*Primary Examiner* — Jonathan G Jelsma
(74) *Attorney, Agent, or Firm* — NIXON & VANDERHYE, PC

(57) ABSTRACT

Provided herein are positive electrode active substance particles comprising a lithium nickelate composite oxide which have a high energy density and are excellent in repeated charge/discharge cycle characteristics when charging at a high voltage, as well as a non-aqueous electrolyte secondary battery. The positive electrode active substance (Continued)

particles herein can each comprise a core particle X comprising a lithium nickelate composite oxide having a layer structure which is represented by the formula: $Li_{1+a}Ni_{1-b-c}Co_bM_cO_2$, as defined herein; and a coating compound Y comprising at least one element selected from the group consisting of Al, Mg, Zr, Ti and Si and having an average film thickness of 0.2 to 5 nm, in which a crystal phase having a layered rock salt structure and comprising $Ni^{2+}$ ions is present in the form of a layer between the core particle X and the coating compound Y.

8 Claims, 1 Drawing Sheet

(51) Int. Cl.
  *H01M 4/36* (2006.01)
  *H01M 4/62* (2006.01)
  *H01M 10/0525* (2010.01)
  *H01M 4/02* (2006.01)

(52) U.S. Cl.
  CPC ..... *H01M 10/0525* (2013.01); *C01P 2002/20* (2013.01); *C01P 2002/52* (2013.01); *C01P 2002/72* (2013.01); *C01P 2004/84* (2013.01); *C01P 2006/12* (2013.01); *C01P 2006/40* (2013.01); *H01M 2004/021* (2013.01); *H01M 2004/028* (2013.01)

(58) Field of Classification Search
  CPC ......... H01M 2004/028; H01M 4/0404; H01M 4/505; H01M 10/052; C01G 53/42; C01P 2002/20; C01P 2002/52; C01P 2002/72; C01P 2004/84; C01P 2006/12; C01P 2006/40; C01P 2002/54; C01P 2002/77; C01P 2004/45; C01P 2004/61; C01P 2004/86; C01P 2006/60; Y02E 60/10
  See application file for complete search history.

(56) References Cited

U.S. PATENT DOCUMENTS

| | | | | |
|---|---|---|---|---|
| 9,159,998 | B2* | 10/2015 | Nagai | ................. H01M 10/052 |
| 2014/0162132 | A1* | 6/2014 | Ishii | .................. C23C 16/45555 |
| | | | | 427/78 |
| 2017/0207455 | A1 | 7/2017 | Watanabe et al. | |
| 2020/0343547 | A1* | 10/2020 | Yokoyama | .............. H01M 4/62 |

FOREIGN PATENT DOCUMENTS

| | | |
|---|---|---|
| JP | 10-302779 | 11/1998 |
| JP | 2000-133246 | 5/2000 |
| JP | 2004-335345 | 11/2004 |
| JP | 2008243448 | 10/2008 |
| JP | 2014-116111 | 6/2014 |
| KR | 20080020087 A * | 3/2008 |
| WO | 2017/123836 | 7/2017 |
| WO | 2019/012497 A1 | 1/2019 |

OTHER PUBLICATIONS

Enlgish translation KR20080020087A, as taught by Cho (Year: 2008).*
Extended European Search Report for corresponding EP Application No. 19760971.2 dated Nov. 17, 2021, 8 pages.
International Preliminary Report on Patentability issued in PCT/JP2019/008127 dated Sep. 8, 2020.
International Search Report for PCT/JP2019/008127, mailed May 21, 2019, 3 pages.
Written Opinion of the ISA for PCT/JP2019/008127, mailed May 21, 2019, 4 pages.

* cited by examiner

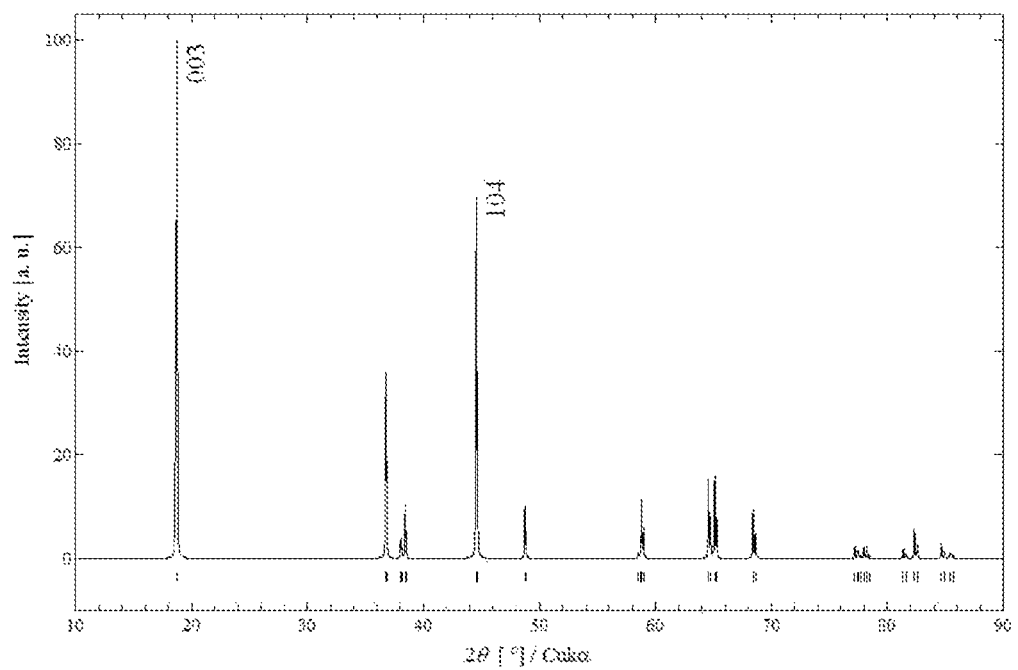

_

LI—NI COMPOSITE OXIDE PARTICLES AND NON-AQUEOUS ELECTROLYTE SECONDARY BATTERY

This application is the U.S. national phase of International Application No. PCT/JP2019/008127 filed 1 Mar. 2019, which designated the U.S. and claims the benefit of U.S. Application No. 62/637,449 filed 2 Mar. 2018, the entire contents of each of which are hereby incorporated by reference.

TECHNICAL FIELD

The present invention relates to positive electrode (cathode) active substance particles that have high energy density and are excellent in repeated charge/discharge cycle characteristics, and a non-aqueous electrolyte secondary battery.

BACKGROUND ART

With the recent rapid progress of technologies for reduction in size and weight of electronic equipments such as mobile phones and personal computers, there is an increasing demand for secondary batteries having a high energy density as a power source for driving these electronic equipments. Under these circumstances, the batteries having a large charge/discharge capacity per unit weight and unit volume and high repeated charge/discharge cycle characteristics have been recently noticed.

Hitherto, as one of raw materials for positive electrode active substance particles useful for high energy-type lithium ion secondary batteries, there is known lithium nickelate $LiNiO_2$ of a layer structure having a 4 V-order voltage. The $LiNiO_2$ particles are inexpensive, have a high capacity and are excellent in output characteristics as compared to lithium cobaltate $LiCoO_2$ particles as generally used positive electrode active substance particles, and therefore have been mainly applied to a main power source for power tools. In recent years, the $LiNiO_2$ particles also tend to be now applied to a driving power source for electric vehicles in view of their characteristics. However, the lithium ion secondary batteries using the aforementioned $LiNiO_2$ particles as positive electrode active substance particles tend to suffer from problems such as deterioration in repeated charge/discharge cycle characteristics owing to elution of those ions other than the $Li^+$ ion from the active substance particles or incompleteness of the reaction between raw material particles upon synthesis thereof. For this reason, it has been demanded to further improve powder characteristics of the active substance particles.

As is well known in the art, in the $NiO_6$ octahedron constituting crystals of the lithium nickelate as the positive electrode active substance particles, the $Ni^{3+}$ ion is kept in a low spin state at room temperature. The d-orbital electronic configuration of the $Ni^{3+}$ ion is represented by $t_{2g}^6 e_g^1$, and the one $e_g$-level electron thereof serves for elongating a bonding distance between Ni and O (Ni—O) to weaken a bonding force therebetween. As a result, the lithium nickelate crystals have failed to exhibit high stability. In addition, the $Ni^{2+}$ ion has an ionic radius close to that of $Li^+$ ion, and therefor tends to suffer from structural defects such as cation mixing upon synthesis of the lithium nickelate crystals. That is, the $LiNiO_2$ particles exhibit such a non-stoichiometric composition as represented by the formula of $Li_{1-z}Ni_{1+z}O_2$ wherein z is more than 0 (z>0), and have a layered rock salt structure in accompaniment with the structural defect (cation mixing) in which the $Ni^{2+}$ ion is present in the site of the $Li^+$ ion. In addition, in the case where the lithium nickelate is used as the positive electrode active substance, the $Ni^{4+}$ ion under the charged condition is kept in a metastable state, and oxygen is released from the lithium nickelate at an elevated temperature, so that the resulting battery tends to suffer from theremorunaway. For this reason, it has been contemplated that the $Ni^{3+}$ ion in the lithium nickelate crystals is substituted with an ion of a different kind of element such as $Co^{3+}$ ion or $Al^{3+}$ ion to improve characteristics thereof (Non-Patent Literature 1).

On the other hand, even the positive electrode active substance particles comprising the lithium nickelate composite oxide in which the $Ni^{3+}$ ion is substituted with an ion of a different kind of element still comprise a more than necessary amount of lithium carbonate or lithium hydroxide as an impurity phase. The lithium compound in the aforementioned impurity phase is a main factor causing increase in a powder pH value of the positive electrode active substance particles, and tends to induce not only gelation of an electrode slurry upon production of the electrode slurry, but also generation of gases owing to occurrence of side reactions upon storage under high-temperature conditions when the resulting secondary battery is subjected to charging and discharging cycles. In particular, in order to avoid remarkable adverse influence of the lithium hydroxide, the unreacted substance being present on a surface of the respective particles is carbonated (Patent Literatures 1 and 2), or removed by washing with water and drying (Non-Patent Literature 2). Meanwhile, the side reactions as described herein mean electrochemical reactions or chemical reactions other than those reactions causing the change in valence of the transition metal owing to entrance and exit of the $Li^+$ ion from the electrode active substance upon charging and discharging the secondary battery. For example, as the side reactions, there may be mentioned the reaction for production of hydrofluoric acid in the electrolyte solution owing to the reaction between water included or produced and the electrolyte $LiPF_6$ in which the electrode active substance is broken by the hydrofluoric acid.

In order to further improve the positive electrode acid substance particles comprising the lithium nickelate composite oxide, there has been proposed the method of subjecting the particles as core particles to surface treatment in which the unreacted lithium carbonate or lithium hydroxide is converted into the other lithium compound. The coating film formed by the surface treatment acts as a protective film against the hydrofluoric acid produced as a by-product by charging and discharging cycles of the resulting battery to prolong a service life of the battery (Non-Patent Literature 3).

In order to still further improve the positive electrode acid substance particles comprising the lithium nickelate composite oxide, there has been proposed the method of subjecting the particles as core particles to surface treatment by a vapor phase epitaxy method. In the method, studies have been made to coat the particles with a very thin coating film formed of an inorganic compound. The very thin coating film obtained by the surface treatment acts for suppressing degradation of the crystal structure in the vicinity of the surface of the respective particles owing to charge/discharge cycles of the resulting battery without inhibiting entrance and exit of the $Li^+$ ion in the particles to prolong a service life of the battery (Non-Patent Literatures 4 to 6).

CITATION LIST

Non-Patent Literatures

Non-Patent Literature 1: C. Delmas, et al., "Electrochimica Acta", Vol. 45, 1999, pp. 243-253

Non-Patent Literature 2: J. Kim, et al., "Electrochem. and Solid-State Lett.", Vol. 9, 2006, pp. A19-A23

Non-Patent Literature 3: M.-J. Lee, et al., "J. Mater. Chem. A", Vol. 3, 2015, pp. 13453-13460

Non-Patent Literature 4: J.-S. Park, et al., "Chem. Mater.", Vol. 26, 2014, pp. 3128-3134

Non-Patent Literature 5: D. Mohanty, et al., "Scientific Reports", Vol. 6, 2016, pp. 26532-1-16

Non-Patent Literature 6: Y. Cho, et al., "Nano Lett.", Vol. 13, 2013, pp. 1145-1152

Patent Literatures

Patent Literature 1: Japanese Patent Application Laid-open (KOKAI) No. 10-302779

Patent Literature 2: Japanese Patent Application Laid-open (KOKAI) No. 2004-335345

SUMMARY OF INVENTION

Technical Problem

At present, it has been strongly required to provide positive electrode active substance particles comprising a lithium nickelate composite oxide for a non-aqueous electrolyte secondary battery, which are capable of maintaining a high capacity by high-voltage charging, and are excellent in repeated charge/discharge cycle characteristics. However, the positive electrode active substance particles capable of satisfying these requirements to a sufficient extent have not been obtained yet.

That is, in the technologies described in the Non-Patent Literatures 1 and 2 as well as the Patent Literatures 1 and 2, although the contents of lithium hydroxide and/or lithium carbonate in the positive electrode active substance particles can be reduced, the particles are brought into direct contact with an electrolyte solution so that it is not possible to suppress occurrence of side reactions on an interface between the positive electrode active substance and the electrolyte solution. Therefore, these technologies have failed to improve repeated charge/discharge cycle characteristics of the resulting battery. In addition, the cost required for water-washing and drying of the lithium nickelate composite oxide particles is comparatively high, and therefore the technologies described in these conventional arts have failed to provide methods suitable for mass-production thereof.

The technology described in the Non-Patent Literature 3 relates to the method of subjecting the lithium nickelate composite oxide particles to surface treatment with vanadium by a sol-gel method. However, owing to poor safety of the vanadium and expensiveness of the sol-gel production method, the surface treatment method described in the Non-Patent Literature 3 has failed to provide a method suitable for mass-production of the positive electrode active substance particles. In addition, the surface coating film obtained by the method has a thickness of 17 nm which is too large to suppress only occurrence of side reactions at an interface between the positive electrode active substance and the electrolyte solution.

The technology described in the Non-Patent Literature 4 relates to the method of forming a very thin inorganic compound film on the surface of the respective lithium nickelate composite oxide particles mainly comprising $Ni^{3+}$ ions by an atomic layer deposition method. However, only formation of the very thin inorganic compound film on the respective particles has failed to sufficiently maintain direct contact between the positive electrode active substance particles and the electrolyte solution, and therefore also has failed to fully improve repeated charge/discharge cycle characteristics of the resulting battery. In addition, the surface of the lithium nickelate particles mainly comprising $Ni^{3+}$ ions has high alkalinity as compared to the surface of the lithium nickelate particles mainly comprising $Ni^{2+}$ ions. For this reason, these different kinds of particles comprising the $Ni^{2+}$ ions and the $Ni^{3+}$ ions, respectively, have failed to pose a common problem concerning the surface condition thereof, and therefore are also different in their design concept from each other.

The technology described in the Non-Patent Literature 5 relates to the method of forming a very thin inorganic compound film on the surface of the respective lithium nickelate composite oxide particles mainly comprising the $Ni^{3+}$ ions by an atomic layer deposition method. However, as described above, only formation of the very thin inorganic compound film on the respective particles has failed to sufficiently maintain direct contact between the positive electrode active substance particles and the electrolyte solution, and therefore also has failed to improve repeated charge/discharge cycle characteristics of the resulting battery. In addition, the surface of the lithium nickelate particles mainly comprising the $Ni^{3+}$ ions which has high alkalinity has failed to fully undergo the surface treatment.

In the technology described in the Non-Patent Literature 6, the $Ni^{2+}$ ion is substituted for the $Li^{+}$ ion site to utilize a pillar effect thereof. More specifically, the surface of the respective positive electrode active substance particles is coated with the crystal phase comprising the $Ni^{2+}$ ion and having a layered rock salt structure to contemplate stabilization of the surface of the respective particles. However, the use of the aforementioned technology tends to be insufficient to stabilize the surface layer of the positive electrode active substance particles, and therefore has failed to sufficiently improve repeated charge/discharge cycle characteristics of the resulting battery.

In consequence, an object or technical task of the present invention is to provide positive electrode active substance particles comprising a lithium nickelate composite oxide which are excellent in repeated charge/discharge cycle characteristics while maintaining a high capacity at a high voltage, and a secondary battery using the positive electrode active substance particles.

Solution to Problem

The above object or technical task can be achieved by the following aspects of the present invention.

That is, according to the present invention, there are provided positive electrode active substance particles each comprising:

a core particle X comprising a lithium nickelate composite oxide having a layer structure which is represented by the formula:

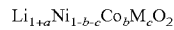

$$Li_{1+a}Ni_{1-b-c}Co_bM_cO_2$$

wherein M is at least one element selected from the group consisting of Mn, Al, B, Mg, Ti, Sn, Zn and Zr; a is a number of −0.1 to 0.2 (−0.1·a·0.2); b is a number of 0.05 to 0.5 (0.05·b·0.5); and c is a number of 0.01 to 0.4 (0.01·c·0.4); and a coating compound Y comprising at least one element selected from the group consisting of Al, Mg, Zr, Ti and Si and having an average film thickness of 0.2 to 5 nm, in which a crystal phase having a layered rock salt structure and comprising $Ni^{2+}$ ions is present in the form of a layer between the core particle X and the coating compound Y (Invention 1).

Also, according to the present invention, there are provided the positive electrode active substance particles as defined in the above Invention 1, wherein an average valence of Ni in the positive electrode active substance particles is 2.80 to 3.10 (Invention 2).

Also, according to the present invention, there are provided the positive electrode active substance particles as defined in the above Invention 1, wherein a content of lithium hydroxide LiOH in the positive electrode active substance particles is not more than 0.50% by weight, a content of lithium carbonate $Li_2CO_3$ in the positive electrode active substance particles is not more than 0.65% by weight, and a weight ratio of the content of the lithium carbonate to the content of the lithium hydroxide is not less than 0.9 (Invention 3).

Also, according to the present invention, there are provided the positive electrode active substance particles as defined in the above Invention 1, wherein the positive electrode active substance particles have a BET specific surface area of 0.05 to 0.70 $m^2/g$, a median diameter $D_{50}$ of aggregated particles of 1 to 30 μm, and a 2% powder pH value of not more than 11.6 (Invention 4).

In addition, according to the present invention, there is provided a non-aqueous electrolyte secondary battery comprising a positive electrode active substance that at least partially comprises the positive electrode active substance particles as defined in the above Invention 1 (Invention 5).

Advantageous Effects of Invention

In the positive electrode active substance particles comprising the lithium nickelate composite oxide according to the present invention, the core particle X comprising the lithium nickelate composite oxide is provided thereon with the coating compound Y, and at the same time, the crystal phase having a layered rock salt structure and comprising $Ni^{2+}$ ions is present in the form of a layer between the core particle X and the coating compound Y. For this reason, the electrolyte solution and the lithium nickelate composite oxide particles can be prevented from suffering from direct contact therebetween within the resulting battery to suppress occurrence of side reactions in the battery, and entrance and exit of the $Li^+$ ion in the battery is not inhibited. As a result, the positive electrode active substance particles comprising the lithium nickelate composite oxide according to the present invention can be suitably used as positive electrode active substance particles for a non-aqueous electrolyte secondary battery which are capable of maintaining a high capacity, and are excellent in repeated charge/discharge cycle characteristics.

BRIEF DESCRIPTION OF THE DRAWING

FIG. 1 shows a powder X-ray diffraction pattern using a lattice constant of existing $LiNi_{0.80}Co_{0.15}Al_{0.05}O_2$.

DESCRIPTION OF EMBODIMENTS

The construction of the present invention is described in more detail below.

First, the lithium nickelate-based positive electrode active substance particles according to the present invention are described.

The lithium nickelate $LiNiO_2$ according to the present invention has a layer structure formed of a trigonal system having a space group of R3-m wherein the line "-" in the symbol of the space group which is located after "3" means such a mark as generally expressed by a macron which should be laid on "3", but is conveniently positioned after "3" herein. The lithium nickelate $LiNiO_2$ comprises a hexagonal lattice as a unit cell, and therefore variable lattice constants thereof are those on the a and c axes. In addition, the lithium nickelate composite oxide having the same crystal structure according to the present invention comprises a base material constituted of the lithium nickelate, and is represented by the chemical formula:

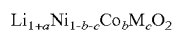

wherein M is at least one element selected from the group consisting of Mn, Al, B, Mg, Ti, Sn, Zn and Zr; a is a number of −0.1 to 0.2 (−0.1·a·0.2); b is a number of 0.05 to 0.5 (0.05·b·0.5); and c is a number of 0.01 to 0.4 (0.01·c·0.4).

The element M in the aforementioned formula is desirably capable of forming a solid solution with $LiNiO_2$, and substituted for $Ni^{2+}$ ion or $Ni^{3+}$ ion. Therefore, the average valence of the element M is preferably close to a number of 2 to 3. In addition, a, b and c are preferably in the ranges of −0.05 to 0.1 (−0.05·a·0.1), 0.06 to 0.4 (0.06·b·0.4) and 0.02 to 0.38 (0.02·c·0.38), respectively, and more preferably −0.07 to 0.08 (−0.07·a·0.08), 0.07 to 0.35 (0.07·b·0.35) and 0.03 to 0.36 (0.03·c·0.36), respectively.

The lithium nickelate-based positive electrode active substance particles according to the present invention comprise the particles represented by the above chemical formula as the core particle X, and the coating compound Y comprising at least one element selected from the group consisting of Al, Mg, Zr, Ti and Si and having an average film thickness of 0.2 to 5 nm. When the average film thickness of the coating compound Y is less than 0.2 nm, the resulting coating compound Y tends to exhibit a low coating ratio, and have no desirable influence on electrical properties thereof. On the other hand, when the average film thickness of the coating compound Y is more than 5 nm, the resulting coating compound Y tends to act as a barrier against conduction of ions or electrons so that the electrical characteristics of the resulting battery tend to be adversely affected owing to a high electric resistance thereof. The aforementioned average film thickness of the coating compound Y is preferably 0.21 to 2.0 nm and more preferably 0.22 to 1.0 nm.

In the lithium nickelate-based positive electrode active substance particles according to the present invention, the coating compound Y may be either in an amorphous state or in a crystalline state. The coating compound Y which is in a crystalline state may be formed on the core particles as a base material by epitaxial growth. The epitaxial growth as used herein means that crystals of the coating compound Y are grown along a crystal plane of the core particle X. The crystal structure of the coating compound Y is preferably the same as or similar to that of the lithium nickelate composite oxide as a host crystal material so as to allow epitaxial growth of the coating compound Y. For example, the crystal structure of the coating compound Y is preferably in the form of an oxide having a layer structure, a layered rock salt structure, a rock salt structure, a spinel structure or the like, i.e., is preferably in the form of a compound whose oxygen forms a face centered cubic lattice or a distorted face centered cubic lattice and which comprises at least one cation selected from the group consisting of elements Al, Mg, Zr, Ti and Si between anion layers each formed by an oxygen hexagonal lattice. More specifically, as the coating compound Y, there may be mentioned $\gamma$-$Al_2O_3$, $\alpha$-$LiAlO_2$, MgO, $Li_2ZrO_3$, $Li_2TiO_3$, etc.

In the lithium nickelate-based positive electrode active substance particles according to the present invention, the crystal phase having a layered rock salt structure and comprising $Ni^{2+}$ ions is present in the form of a layer between the core particle X and the coating compound Y. That is, the core particle X is covered with the crystal phase having a layered rock salt structure and comprising $Ni^{2+}$ ions, and further covered with the coating compound Y. The aforementioned respective $Ni^{2+}$ ions are penetrated into the normal $Li^+$ ion site, and the thus penetrated $Ni^{2+}$ ions have activity by a pillar effect thereof to ensure stabilization between layers of the layered rock salt structure. In association with such a pillar effect and the presence of the coating compound Y, the battery using the positive electrode active substance particles comprising the lithium nickelate composite oxide according to the present invention can be further improved in repeated charge/discharge cycle characteristics.

In the lithium nickelate-based positive electrode active substance particles according to the present invention, the ratio (mol %) of the crystal phase having a layered rock salt structure and comprising $Ni^{23+}$ ions to the core particle X is preferably in the range of 0.1 mol % to 3.0 mol %. In this case, the crystal phase having a layered rock salt structure and comprising $Ni^{2+}$ ions is present between the core particle X and the coating compound Y. When the aforementioned ratio of the crystal phase to the core particle X is less than 0.1 mol %, it is hardly expected to ensure stabilization of the crystal structure by the pillar effect of the $Ni^{2+}$ ions. On the other hand, when the ratio of the crystal phase to the core particle X is more than 3.0 mol %, the crystal phase tends to act as a resistance to movement of the $Li^+$ ion, which tends to cause deterioration in capacity of the resulting battery. The ratio of the crystal phase to the core particle X is more preferably 0.2 mol % to 2.5 mol %.

The average valence of Ni in the lithium nickelate-based positive electrode active substance particles according to the present invention is preferably in the range of 2.80 to 3.10. When the average valence of Ni in the lithium nickelate-based positive electrode active substance particles falls within the aforementioned range, it can be expected that the resulting battery has high capacity. The average valence of Ni in the lithium nickelate-based positive electrode active substance particles is more preferably in the range of 2.85 to 3.08, and even more preferably 2.90 to 3.05.

In the lithium nickelate-based positive electrode active substance particles according to the present invention, the coating compound Y preferably comprises Li element. When incorporating Li into the coating compound Y, movement of the $Li^+$ ion in the coating compound Y can be further facilitated, so that a resistance in the resulting battery can be reduced.

It is preferred that the lithium nickelate-based positive electrode active substance particles according to the present invention are positive electrode active substance particles formed by further coating the aforementioned particles with lithium carbonate. The lithium carbonate is one of reaction by-products produced upon charging/discharging operations of the resulting battery, and is one factor of causing deterioration in repeated charge/discharge cycle characteristics of the battery. By previously incorporating the lithium carbonate into the positive electrode active substance prior to construction of the battery, it is possible to suppress formation of the lithium carbonate as a reaction byproduct produced upon the charging/discharging operations and attain good repeated charge/discharge cycle characteristics of the resulting battery.

In the lithium nickelate-based positive electrode active substance particles according to the present invention, the content of lithium hydroxide LiOH therein is preferably not more than 0.50% by weight, the content of lithium carbonate $Li_2CO_3$ therein is preferably not more than 0.65% by weight. In particular, the lower content of lithium hydroxide in the positive electrode active substance particles is preferable. The ratio of the content of the lithium carbonate to the content of the lithium hydroxide is preferably not less than 0.9. The contents of the impurity compounds that may serve as a source for the aforementioned alkalis in the positive electrode active substance particles is more preferably as low as possible. More specifically, it is more preferred that the content of LiOH in the positive electrode active substance particles is not more than 0.47% by weight, the content of $Li_2CO_3$ in the positive electrode active substance particles is not more than 0.55% by weight, and the ratio of the content of the lithium carbonate to the content of the lithium hydroxide is not less than 1.2. It is even more preferred that the ratio of the content of the lithium carbonate to the content of the lithium hydroxide is not less than 1.4.

The BET specific surface area of the lithium nickelate-based positive electrode active substance particles according to the present invention is preferably 0.05 to 0.7 $m^2/g$. When the BET specific surface area of the lithium nickelate-based positive electrode active substance particles is less than 0.05 $m^2/g$, the amount of coarse particles included in the resulting particles tends to be increased. On the other hand, when the BET specific surface area of the lithium nickelate-based positive electrode active substance particles is more than 0.7 $m^2/g$, the resulting particles tend to be bulky particles. In the case where the BET specific surface area of the lithium nickelate-based particles is either less than 0.05 $m^2/g$ or more than 0.7 $m^2/g$, the resulting particles tend to become unsuitable as positive electrode active substance particles. The BET specific surface area of the lithium nickelate-based positive electrode active substance particles according to the present invention is more preferably 0.1 to 0.5 $m^2/g$.

The median diameter $D_{50}$ of aggregated particles of the lithium nickelate-based positive electrode active substance particles according to the present invention is preferably 1 to 30 μm. When the median diameter $D_{50}$ of aggregated particles of the lithium nickelate-based positive electrode active substance particles is less than 1 μm, the resulting particles tend to be bulky particles. On the other hand, when the median diameter $D_{50}$ of aggregated particles of the lithium nickelate-based positive electrode active substance particles is more than 30 μm, the amount of coarse particles included in the resulting particles tends to be increased. In the case where the median diameter $D_{50}$ of aggregated particles of the lithium nickelate-based positive electrode active substance particles is either less than 1 μm or more than 30 μm, the resulting particles tend to become unsuitable as positive electrode active substance particles. The median diameter $D_{50}$ of aggregated particles of the lithium nickelate-based positive electrode active substance particles according to the present invention is more preferably 2 to 25 μm and even more preferably 3 to 22 μm.

The 2% pH value of an electrode slurry comprising the lithium nickelate-based positive electrode active substance particles according to the present invention is preferably not more than 11.6 and more preferably not more than 11.5 from the standpoint of avoiding gelation of the electrode slurry.

In the following, the method of producing the core particle X constituted of the lithium nickelate composite oxide according to the present invention is described.

In the method of producing the core particle X constituted of the lithium nickelate composite oxide used in the present invention, nickel hydroxide particles are used as a precursor of the core particle X. The nickel element in the nickel hydroxide particles may be substituted with a cobalt element or the other element M (such as Mn, Al, B, Mg, Ti, Sn, Zn and Zr). The method of producing the aforementioned precursor is not particularly limited. However, the precursor is preferably produced by a crystallization method using an ammonia complex in a wet reaction. In the method, the precursor is mixed with a lithium raw material and additives as desired, and the resulting mixture is calcined. The lithium raw material used above is not particularly limited, and lithium carbonate, lithium hydroxide and lithium hydroxide monohydrate may be used as the lithium raw material.

The core particle X constituted of the lithium nickelate composite oxide according to the present invention may be produced by a solid state reaction method as used in the aforementioned procedure in which the mixture of the precursor and the respective raw materials is calcined. The solid state reaction is such a reaction method in which the raw materials comprising respective elements constituting the target particles as aimed are mixed with each other, and the resulting mixture is subjected to high-temperature heat treatment to promote a chemical reaction between the solid raw materials. In order to facilitate diffusion of lithium in the precursor during the solid state reaction, it is desired that the particle diameter of the lithium raw material is very small or fine. It is also desired that the precursor and the raw materials are mixed by a dry method using no solvent. As the apparatus used for mixing the raw material particles, there may be used an attritor, a ball mill, a Henschel mixer, a high-speed mixer, etc.

As is well known in the art, it has been pointed out that upon synthesis of lithium nickelate by a solid state reaction, a part of nickel is converted into $Ni^{2+}$ ion when calcined at an elevated temperature, and the $Ni^{2+}$ ion is substituted for $Li^+$ ion in the crystal thereof to thereby form a layered rock salt structure having structural defects, which results in deterioration in capacity of the resulting battery. In addition, it is also known in the art that NiO having a rock salt structure ($Li_{1-z}Ni_{1+z}O_2$ wherein $z=1$) is produced in association with evaporation of Li when calcined at a still higher temperature. Also, it has become apparent from X-ray diffraction analysis that $Li_{1-z}Ni_{1+z}O_2$ wherein $z>0$ which has a layered rock salt structure is produced in association with substitution of $Ni^{2+}$ ion for $Li^+$ ion site. Furthermore, it is also known by observation using a high-resolution transmission electron microscope that a large amount of the layered rock salt structure comprising the $Ni^{2+}$ ion is present on the surface of the respective positive electrode active substance particles (refer to J. Moraless, et al., "Mat. Res. Bull.", Vol. 25, 1990, pp. 623-630; H. Arai, et al., "Solid State Ionics", Vol. 80, 1995, pp. 261-269; and D. P. Abraham, et al., "J. Electrochem. Soc.", Vol. 80, 1995, pp. 261-269).

The method of producing the core particle X constituted of the lithium nickelate composite oxide according to the present invention is characterized in that the aforementioned mixture is calcined in the temperature range of 600 to 930° C. When the calcining temperature is lower than 600° C., the solid state reaction tends to hardly proceed sufficiently, so that it may be impossible to obtain desired lithium nickelate composite oxide particles. When the calcining temperature is higher than 930° C., the amount of the $Ni^{2+}$ ion penetrated into the $Li^+$ ion site as the structural defect tends to be increased, so that NiO having a rock salt structure as an impurity phase tends to be grown via $Li_{1-z}Ni_{1+z}O_2$ having a layered rock salt structure. The calcining temperature is preferably 700 to 900° C.

The core particle X constituted of the lithium nickelate composite oxide according to the present invention is preferably produced by calcination in a high-oxygen concentration atmosphere in order to reduce the content of the $Ni^{2+}$ ion therein. The retention time of the aforementioned calcining temperature is about 5 to about 15 hr, and the temperature rise rate or temperature drop rate in the calcination is about 50 to about 200° C./hr. As the calcination furnace, there may be used a gas-flow box-type muffle furnace, a gas-flow rotary furnace, a roller hearth kiln, etc.

The core particle X constituted of the lithium nickelate composite oxide according to the present invention undergoes substantially no change in lattice constant or crystallite size on the basis of the crystal information obtained by observation using X-ray diffraction either under the condition in which the lithium nickelate composite oxide is in the state capable of being subsequently formed into the core particle immediately before forming the coating compound Y thereon, or under the condition in which the lithium nickelate composite oxide is already covered with the coating compound Y and therefore can serve as the core particle, and maintains the layer structure. It is understood that the aforementioned results are obtained owing to a very thin thickness of the coating compound Y. However, when subsequently subjecting the core particle constituted of the lithium nickelate composite oxide to the below-mentioned heat treatment and observing the resulting heat-treated material by X-ray diffraction, it is confirmed that the diffraction intensity ratio of the (003) plane to the (104) plane in the lithium nickelate composite oxide is lowered, so that the crystal phase of $Li_{1-z}Ni_{1+z}O_2$ having a layered rock salt structure is increased in association with increase of $Ni^{2+}$ ions therein. As is explained by a simplified model, it is estimated that a part of $LiNiO_2$ in the surface layer of the core particle is separated into (½) $Li_2O$ and NiO, and converted into (¼) $O_2$ to be released into atmospheric air. That is, it is estimated that in the lithium nickelate-based positive electrode active substance particles according to the present invention, by subjecting the particles to the aforementioned heat treatment, the crystal phase having a layered rock salt structure and comprising $Ni^{2+}$ ions is produced in the form of a layer between the core particle X and the coating compound Y.

In the following, the method of producing the coating compound Y comprising at least one element selected from the group consisting of Al, Mg, Zr, Ti and Si and having an average film thickness of 0.2 to 5 nm which is to be formed on the core particle X constituted of the lithium nickelate composite oxide according to the present invention is described.

The coating compound Y according to the present invention is preferably produced by a vapor phase epitaxy method. Examples of the vapor phase epitaxy method include a chemical vapor deposition (CVD) method, a physical vapor deposition (PVD) method and an atomic layer deposition (ALD) method. The atomic layer deposition method is one of the vapor phase epitaxy methods more preferably used in the present invention in which atomic layers are formed one by one (about 1 Å for each), i.e., the method in which atoms are deposited in the form of a layer or a granule by repeating the following four steps: 1) supply of a raw material gas A to a material to be treated, i.e., reaction of the raw material gas A on the surface of the material to be treated; 2) evacuation of the raw material gas A; 3) supply of a raw material gas B that is further reacted on the surface of the material to be treated; and 4) evacuation of the raw material gas B, wherein the raw material gas A and the raw material gas B are necessarily different in composition from each other (refer to X. Meng, et al., "Adv. Mater.", Vol. 24, 2012, pp. 3589-3615, and A. W. Weimer, PARTEC 2004, "Particle Coating by Atomic Layer Deposition (ALD)").

Examples of the preferred combination of the raw material gas A and the raw material gas B used in the atomic layer deposition method as the method of producing the coating compound Y according to the present invention are as follows:

Raw Material Gas A/Raw Material Gas B:

Al $(CH_3)$/$H_2O$; Mg $(C_2H_5)$/$H_2O$; $ZrCl_4$/$H_2O$; $TiCl_4$/$H_2O$; $SiCl_4$/$H_2O$; etc.

It is estimated that the atomic layer deposition method is capable of producing an oxide, a carbonate or a hydroxide from these raw materials.

In the atomic layer deposition method as the method of producing the coating compound Y according to the present invention, the number of repeated operations of the method including the steps 1) to 4) is 1 to 100 (times), preferably 2 to 50 and more preferably 2 to 10.

In the atomic layer deposition method as the method of producing the coating compound Y according to the present invention, the temperature used for conducting the steps 1) through 4) may be an optional temperature within the range of 10 to 250° C.

In the method of producing the coating compound Y according to the present invention, after completion of the aforementioned vapor phase epitaxy treatment, the heat treatment may be conducted in atmospheric air at an optional temperature within the range of 150 to 500° C. for a temperature retention time of 2.5 to 10 hr at a temperature rise rate or temperature drop rate of 50 to 200° C./hr. As the heat treatment furnace usable in the heat treatment, there may be mentioned a gas-flow box-type muffle furnace, a gas-flow rotary furnace, a roller hearth kiln, etc. When conducting the aforementioned heat treatment, it is possible to form the crystal phase having a layered rock salt structure and comprising $Ni^{2+}$ ions in the form of a layer between the core particle X and the coating compound Y. The aforementioned heat treatment is also capable of enhancing a degree of epitaxial growth and a crystallinity of the coating compound Y and also capable of enhancing reactivity between the coating compound Y and Li, and furthermore capable of converting LiOH remaining in the particles obtained after the aforementioned film-forming step into $Li_2CO_3$. It is more preferred that the heat treatment temperature is in the range of 200 to 450° C., the temperature retention time is 3 to 8 hr, and the temperature rise rate or temperature drop rate is 60 to 180° C./hr. As the temperature pattern of the aforementioned heat treatment, there may be used any suitable temperature pattern other than the aforementioned trapezoidal temperature pattern in which the temperature varies at a constant temperature rise rate or at a constant temperature drop rate. More specifically, the temperature pattern may be such a multi-stage temperature pattern that the temperature increases at a constant temperature rise rate to 100° C. at which the system of the heat treatment is temporarily maintained for 2 hr, and then the temperature increases to 350° C. at which the system is maintained for 2 hr. The aforementioned heat treatment may also be conducted under any suitable atmosphere other than the atmospheric air. Examples of the other atmosphere used in the heat treatment include an oxygen atmosphere, a nitrogen atmosphere, a high-humidity atmosphere or a composite atmosphere of these atmospheres.

The coating compound Y according to the present invention is produced in the form of a film on the core particle X by a vapor phase epitaxy method as described above, and then subjected to the heat treatment. Therefore, the coating compound Y may be present in the form of a very thin film having a thickness of 0.2 to 5 nm which is uniform and has a relatively high crystallinity. Examples of particle surface analysis methods used for identifying the crystal structure of the aforementioned coating compound Y include observation using a scanning transmission electron microscope (STEM), elemental analysis in a depth direction by time-of-flight type secondary ion mass spectrometry, elemental analysis in a depth direction by X-ray photoelectron spectroscopy, etc. In addition, there may also be used the method of estimating the crystal structure of the coating compound Y on the basis of concentrations of elements eluted when subjecting the coating compound solely to chemical etching in a solvent.

The observation of the coating compound Y according to the present invention by STEM may be conducted as follows. As the pretreatment of the sample to be observed, the sample particles according to the present invention are embedded in a resin, and sliced into a thin piece having a thickness of about 100 nm by an ion slicer to observe about 10 points corresponding to positions on an outermost surface of respective optional selected aggregated particles using STEM. In this case, crystal particles are selected randomly at about 10 positions on the outermost surface of the aggregated particles, and observed with a crystal zone axis of the crystal of the lithium nickelate composite oxide having a layer structure. In the bright field (BF) image, the atom column reflecting an electrostatic potential of the crystal or the atomic layer is observed to determine the crystal zone axis. The positional information of a heavy atom in the crystal is retrieved from the high-angle annular dark field (HAADF) image, and adverse influence of interference fringes that might be observed in the BF image is removed to obtain the information concerning a boundary surface between the core particle X and the coating compound Y. The core particle X is present inside of the boundary surface, the coating compound Y is present outside of the boundary surface and therefore the crystal information of the coating compound Y is attained from the BF image corresponding to this position. Also, from the low-angle annular dark field (LAADF) image, a distorted layer that is present in the crystal of the lithium nickelate composite oxide in association with the coating compound Y is determined. Using an energy dispersive X-ray spectroscopy (EDS) apparatus attached thereto, heavy elements heavier than boron B are identified to obtain the positional information concerning these elements. In addition, using an electron energy loss spectroscopy (EELS) apparatus, light elements such as lithium Li, etc., are identified to obtain the positional information concerning these elements.

In the method of producing the coating compound Y according to the present invention, the aforementioned heat treatment conducted after formation of the film by the vapor phase epitaxy method is capable of improving not only the performance of the coating compound Y, but also the surface of the other positive electrode active substance particles. More specifically, the aforementioned heat treatment is accompanied with such an effect that the lithium hydroxide LiOH remaining in the positive electrode active substance particles is efficiently converted into lithium carbonate $Li_2CO_3$. In particular, the heat treatment is technically characterized in that by setting the temperature rise rate or the retention temperature to a lower level, water in air is absorbed into the positive electrode active substance particles, and the residual lithium hydroxide LiOH present in the particles is chemically transformed into $LiOH \cdot H_2O$ that tends to be easily carbonated at a low temperature. In this case, a slight amount of Li may be eluted from the lithium nickelate composite oxide and allowed to undergo chemical transformation into $LiOH \cdot FH_2O$.

The lithium carbonate crystallized and deposited in the present invention may be sometimes in the form of granules or a film. Examples of particle surface analysis methods used for identifying the structure of the aforementioned lithium carbonate include observation using STEM, observation using a high-resolution scanning electron microscope (SEM), elemental analysis in a depth direction by time-of-flight type secondary ion mass spectrometry, elemental analysis in a depth direction by X-ray photoelectron spectroscopy, etc.

In the following, the non-aqueous electrolyte secondary battery using the lithium nickelate-based positive electrode active substance particles according to the present invention is described.

When producing a positive electrode sheet using the positive electrode active substance particles according to the present invention, a conducting agent and a binder are added to and mixed with the positive electrode active substance particles by an ordinary method. Examples of the preferred conducting agent include carbon black, graphite and the like. Examples of the preferred binder include polytetrafluoroethylene, polyvinylidene fluoride and the like. As a solvent used for mixing these components, for example, N-methyl pyrrolidone is preferably used. The slurry comprising the positive electrode active substance particles, the conductive agent and the binder is kneaded until it becomes a honey-like liquid. The resulting positive electrode mixture slurry is applied onto a current collector at a coating speed of about 60 cm/sec using a doctor blade having a groove width of 25 to 500 μm, and then the resulting coating layer formed on the current collector is dried at a temperature of 80 to 180° C. for the purpose of removing the solvent therefrom and softening the binder. As the current collector, there may be used an Al foil having a thickness of about 20 μm. The current collector to which the positive electrode mixture has been applied is subjected to calendar roll treatment with a linear load of 0.1 to 3 t/cm, thereby obtaining the positive electrode sheet.

As a negative electrode active substance used in the battery, there may be used metallic lithium, lithium/aluminum alloys, lithium/tin alloys, graphite or the like. A negative electrode sheet is produced by the same doctor blade method as used upon production of the aforementioned positive electrode sheet, or metal rolling.

Also, as a solvent for preparation of the electrolyte solution, there may be used a combination of ethylene carbonate and diethyl carbonate, as well as an organic solvent comprising at least one compound selected from the group consisting of carbonates such as propylene carbonate and dimethyl carbonate, and ethers such as dimethoxyethane.

In addition, as the electrolyte solution, there may be used a solution prepared by dissolving lithium phosphate hexafluoride as well as at least one lithium salt selected from the group consisting of lithium perchlorate, lithium borate tetrafluoride and the like as an electrolyte in the aforementioned solvent.

In the secondary battery having an Li counter electrode which is produced by using the positive electrode active substance particles according to the present invention, the initial (first) discharge capacity thereof until reaching 3.0 V after being charged at 4.4 V is respectively not less than 190 mAh/g as measured at 25° C. In general, as compared to the battery with the Li counter electrode which is charged at 4.3 V, since the battery is charged at a higher voltage, the capacity of the battery becomes higher, and as a result, it is possible to obtain a secondary battery having a high energy density. In addition, when the battery is discharged in the same voltage range at 0.5C in 20th, 40th, 60th, . . . and 140th cycles and at 1C in the other cycles, the capacity retention rate of the battery in the 140th cycle relative to the initial discharge capacity at a rate of 1C is not less than 85%. As a result, it is possible to obtain the secondary battery that is excellent in repeated charge/discharge cycle characteristics upon charging at a high voltage.

<Function>

The positive electrode active substance particles comprising the lithium nickelate composite oxide according to the present invention comprise the uniform and very thin coating compound Y formed by a vapor phase epitaxy method, and the crystal phase having a layered rock salt structure showing a pillar effect and comprising $Ni^{2+}$ ions is present in the form of a layer between the core particle X and the coating compound Y. The coating compound Y has a high coating ratio, so that the resulting secondary battery can be inhibited from suffering from occurrence of side reactions while maintaining a high capacity when subjecting the secondary battery to repeated charge/discharge cycles. As a result, the positive electrode active substance particles according to the present invention can be suitably used as positive electrode active substance particles that have a high current density and are excellent in repeated charge/discharge cycle characteristics, and therefore can be suitably used as those for a secondary battery.

EXAMPLES

Specific examples of the present invention are described below.

Example 1

Cobalt-containing nickel hydroxide $Ni_{0.84}Co_{0.16}(OH)_2$ as a precursor was obtained by a crystallization method via an ammonia complex in a water solvent over several days. The cobalt-containing nickel hydroxide, lithium hydroxide monohydrate $LiOH \cdot H_2O$ and aluminum hydroxide $Al(OH)_3$ were weighed in predetermined amounts such as the molar ratio between elements Li, Ni, Co and Al therein was Li:Ni:Co:Al=1.02:0.81:0.15:0.04. Thereafter, these compounds were mixed with each other using a high-speed mixer, and the resulting mixture was calcined in an oxygen atmosphere at 770° C. using a roller hearth kiln, thereby obtaining a lithium nickelate composite oxide capable of being subsequently formed into the core particle X.

The resulting particles capable of being subsequently formed into the core particle X were treated by an atomic layer deposition method. In the atomic layer deposition method, trimethyl aluminum $Al(CH_3)_3$ was used as a raw material gas A, and $H_2O$ was used as a raw material gas B. The respective materials were subjected to 4 cycle treatment at 180° C., thereby obtaining lithium nickelate composite oxide particles comprising the coating compound Y.

Three hundred grams of the resulting lithium nickelate composite oxide particles comprising the coating compound Y were subjected to heat treatment in atmospheric air at 350° C. for 3 in which the treatment temperature was varied from room temperature at a temperature rise rate/temperature drop rate of 150° C./hr. It is considered that in the heat treatment, LiOH remaining in the oxide particles was converted into LiOH·$H_2O$ which was then further converted into $Li_2CO_3$. In addition, in the aforementioned heat treatment, the lithium nickelate composite oxide particles comprising the coating compound Y that had a higher degree of epitaxial growth were produced. The resulting oxide particles were treated as positive electrode active substance particles.

The powder characteristics of the lithium nickelate-based positive electrode active substance particles according to the present invention as well as the characteristics of the resulting battery were evaluated as follows. The evaluation results thus obtained are shown in Table 1.

The surface and shape of the sample were observed using a field emission type scanning electron microscope (FE-SEM) "S-4800" manufactured by Hitachi High-Technologies Corporation.

It was estimated that the coating compound produced by ALD method had a composition of $Al_2O_3$ from the raw material species used therefor. The quantitative determination of the coating compound was conducted as follows. That is, 5 g of the sample was dispersed in 100 cc of pure water, followed by boiling and cooling the resulting dispersion to determine an amount of Al dissolved in the dispersion. The amount of the coating compound was calculated from the amount of Al thus determined. In addition, assuming that the positive electrode active substance particles had a spherical shape having the below-mentioned median diameter $D_{50}$ of aggregated particle of the sample, the film thickness of the coating compound was calculated from the thus determined amount of Al. Incidentally, the coating ratio of the respective particles with the coating compound was regarding as being 100%.

The average valence of the nickel in the sample was quantified by iodometric titration. That is, the sample was accurately weighed in an amount of 0.100 g, dissolved in hydrochloric acid and then mixed with a potassium iodide solution. As a result of the mixing, the transition metal dissolved was reduced into a divalence, so that the iodide ions were changed into an iodine molecule $I_2$. The thus produced iodine molecule $I_2$ was subjected to automatic titration with a sodium thiosulfate solution as a reduction titration reagent to determine the average valence of nickel. In the above measurement, the average valence of cobalt was regarded as being a trivalence.

The BET specific surface are of the sample was determined as follows. That is, the sample was dried and deaerated at 250° C. for 10 min in a nitrogen gas atmosphere, and then the BET specific surface area of the thus treated sample was measured using "Macsorb" manufactured by Quantachrome Instruments.

In order to identify a crystal phase of the sample and calculate parameters of a crystal structure thereof, the sample was measured using a powder X-ray diffraction apparatus "SmartLab 3 kW" manufactured by Rigaku Co., Ltd. The X-ray diffraction pattern of the sample was measured by passing the sample through a monochromater under conditions of Cu-Kα, 40 kV and 44 mA, and the measurement was conducted by a step scanning method at a rate of 3 deg./min at the step intervals of 0.02° in the range of 2θ (deg.) of 15 to 120 (15·2θ (deg.)·120). The crystal information data were calculated by using Rietveld method. The information concerning cation mixing of $Ni^{2+}$ ions was obtained from the peak intensity ratio of the (003) plane to the (104) plane of the layered rock salt structure as shown in FIG. 1.

The median diameter $D_{50}$ of aggregated particle of the sample as a volume-based average particle diameter thereof was measured using a laser diffraction scattering type particle size distribution meter "SALD-2201" manufactured by Shimadzu Corporation.

The amounts of LiOH and $Li_2CO_3$ in the sample were determined by using a Warder method based on calculation from a hydrochloric acid titration curve of a solution prepared by suspending the sample in a water solvent at room temperature. In the method, 10 g of the sample was suspended in 50 cc of water using a magnetic stirrer for 1 hr.

The 2% pH value of the sample was measured as follows. That is, 2 g of the sample was suspended in 100 cc of pure water at room temperature, and the pH value of the resulting suspension was measured using a pH meter at room temperature.

The contents of lithium and nickel as main component elements as well as the contents of cobalt and aluminum as subsidiary component elements in the sample were determined as follows. That is, the sample particles were completely dissolved in hydrochloric acid, and the resulting solution was measured using an ICP emission spectroscopic apparatus (ICP-OES) "ICPS-7510" manufactured by Shimadzu Corporation by a calibration curve method.

The CR2032 type coin cell manufactured by the following production method using the thus obtained positive electrode active substance particles was subjected to evaluation of secondary battery characteristics.

The positive electrode active substance, acetylene black and graphite both serving as a conducting agent, and polyvinylidene fluoride as a binder were accurately weighed such that the weight ratio between these components was 90:3:3:4, and dispersed in N-methyl pyrrolidone, and the resulting dispersion was fully mixed using a high-speed kneading machine to prepare a positive electrode mixture slurry. Next, the thus prepared positive electrode mixture slurry was applied onto an aluminum foil as a current collector using a doctor blade "PI-1210 film coater" manufactured by Tester Sangyo Co., Ltd., and then dried at 120° C., and the resulting sheet was pressed under a pressure of 0.5 t/cm, thereby obtaining a positive electrode sheet comprising the positive electrode active substance particles in an amount of 9 mg per 1 $cm^2$ of the positive electrode sheet. The thus obtained positive electrode sheet was punched into 16 mmϕ, and the resulting sheet piece was used as a positive electrode.

A metallic lithium foil was punched into 16 mmϕ, and the resulting sheet piece was used as a negative electrode.

"CELGARD #2400" produced by Celgard, LLC., was punched into a size of 20 mmϕ, and the resulting sheet piece was used as a separator. Moreover, a 1 mol/L $LiPF_6$ solution of a mixed solvent comprising ethylene carbonate and diethyl carbonate at a volume ratio of 1:1 was used as an electrolyte solution. These members were assembled to thereby manufacture a coin cell of a CR2032 type.

In order to prevent decomposition of the electrolyte solution or the metallic lithium by atmospheric air, the assembling of the battery was conducted in a glove box held in an argon atmosphere having a well-controlled dew point.

The initial discharge capacity of the battery at 25° C. was measured by testing the battery using a charge/discharge tester "TOSCAT-3000" manufactured by Toyo System Co., Ltd., in such a condition that under a constant current of 0.1C, the lower limit of a discharge voltage thereof was set to 3.0 V, and the upper limit of a charge voltage thereof was set to 4.4 V. In addition, the battery was tested in the condition that after charging the battery to 4.4 V under a constant current at 0.1C, the lower limit of a discharge voltage thereof at 1C was set to 3.0 V to estimate a ratio of 1C discharge capacity to 0.1C discharge capacity of the battery. Furthermore, the battery was also subjected to 140 charge/discharge cycles test at 25° C. under such a condition that the lower limit of a discharge voltage thereof was set to 3.0 V, and the upper limit of a charge voltage thereof was set to 4.4 V. In the 20th cycle, 40th cycle, 60th cycle, . . . and 140th cycle tests, the battery was discharged at a constant current of 0.5C, whereas in the other cycle tests, the battery was discharged at a constant current of 1C, to calculate a 0.5C discharge capacity retention rate at the 140th cycle based on the initial 1C discharge capacity, i.e., evaluate a so-called rate characteristic of the battery.

As a result of ICP compositional analysis and XRD phase analysis of the lithium nickelate composite oxide particles capable of being subsequently formed into the core particle X which were obtained by the aforementioned solid state reaction, the lithium nickelate composite oxide particles had a composition of $Li_{1.02}Ni_{0.81}Co_{0.15}Al_{0.04}O_2$ having a layer structure. The lattice constant of the aforementioned particles was $a_{hex}$=2.8643 Å and $c_{hex}$=14.186 Å as represented by a hexagonal lattice thereof. The lattice constant of the lithium nickelate-based positive electrode active substance particles was substantially the same as that of the lithium nickelate composite oxide particles capable of being subsequently formed into the core particle X. Therefore, the core particle X constituted of the positive electrode active substance particles comprising the lithium nickelate composite oxide was regarded as having a composition of $Li_{1.02}Ni_{0.81}Co_{0.15}Al_{0.04}O_2$ having a layer structure.

However, the intensity ratio of the (003) plane to the (104) plane [(003)/(104)] in X-ray diffraction pattern of the lithium nickelate composite oxide particles capable of being subsequently formed into the core particle X is 1.76, whereas the aforementioned intensity ratio of the lithium nickelate-based positive electrode active substance particles was 1.61. Therefore, the deterioration or change in intensity ratio of the (003) plane to the (104) plane between these particles was observed by the aforementioned heat treatment conducted in atmospheric air at 350° C. for 3 hr. For this reason, it was considered that the crystal phase having a layered rock salt structure and comprising $Ni^{2+}$ ions was present in the form of a layer between the core particle X and the coating compound Y in the lithium nickelate-based positive electrode active substance particles. The ratio $Ni^{2+}/Ni^{3+}$ in the lithium nickelate composite oxide particles capable of being subsequently formed into the core particle X as measured by Rietveld method was 1.4 mol %, whereas the same ratio $Ni^{2+}/Ni^{3+}$ in the lithium nickelate-based positive electrode active substance particles as measured by Rietveld method was 1.9 mol %, and the difference $\Delta Ni^{2+}/Ni^{3+}$ between these particles was 0.5 mol %. The difference $\Delta Ni^{2+}/Ni^{3+}$ between these particles was regarded as being mol % of the crystal phase having a layered rock salt structure and comprising $Ni^{2+}$ ions based on the core particle X in the lithium nickelate composite oxide particles.

As a result of observing the obtained lithium nickelate-based positive electrode active substance particles by FE-SEM at a magnification of 50,000 times, it was confirmed that irregularities were present on the surface of the respective particles. It was suggested that LiOH present on the surface of the respective particles were transformed into $Li_2CO_3$.

The powder characteristics and battery characteristics of the obtained lithium nickelate-based positive electrode active substance particles are shown in Table 1 together with those of the other Examples and Comparative Examples. The thickness of the coating compound Y was very thin. The average valence of nickel in the lithium nickelate-based positive electrode active substance particles was 2.99. The contents of the lithium hydroxide and lithium carbonate remaining in the lithium nickelate-based positive electrode active substance particles both were low, and the ratio between the contents of the lithium hydroxide and lithium carbonate was as high as 1.25, i.e., was not less than 0.9. The initial capacity of the battery upon high-voltage charging at 4.4 V was about 200 mAh/g, and the ratio of the 1C discharge capacity to the 0.1 C discharge capacity of the battery was as high as 90%. The capacity retention rate of the battery in the 140th cycle characteristics as measured at the same charging voltage as above was also as high as 85%.

Example 2

The same procedure as in Example 1 was conducted under the same conditions except that the temperature used in the heat treatment after producing the coating compound Y by the atomic layer deposition method was changed from 350° C. to 400° C. The resulting oxide particles were evaluated as positive electrode active substance particles.

Comparative Example 1

The lithium nickelate composite oxide $Li_{1.02}Ni_{0.81}Co_{0.15}Al_{0.04}O_2$ having a layer structure capable of being subsequently formed into the core particle X which were obtained in Example 1, were used as positive electrode active substance particles without subjecting the oxide particles to any surface treatment. As shown in Table 1, the amount of LiOH remaining in the resulting particles was large. Also, the initial discharge capacity and the rate characteristics of the resulting battery were substantially the same as those attained in Examples of the present invention, but the battery failed to exhibit good cycle characteristics.

The thus obtained sample was observed at a magnification of 50,000 times by FE-SEM. As a result, it was confirmed that no irregularities were present on the surface of the resulting particles. It is estimated that unlike Example 1, the LiOH that was previously present on the surface of the respective particles still remained as such on the surface of the resulting particles.

Comparative Example 2

The sample withdrawn in the course of the production process in Example 1, i.e., the sample obtained after the treatment by the atomic layer deposition method was used as a positive electrode active substance. As shown in Table 1, it was confirmed that the amount of LiOH remaining in the resulting particles was large, and the resulting battery failed to exhibit good cycle characteristics.

| Example | thickness of coating compound Y (nm) | Δ $Ni^{2+}/Ni^{3+}$ (mol %) | Ni valence of core particle X (-) | LiOH (wt %) | $Li_2CO_3$ (wt %) | $Li_2CO_3$/LiOH (weight ratio) | BET surface area ($m^2$/g) | $D_{50}$ (μm) | pH @2wt % slurry (-) | First Discharge Capacity (mAh/g) | Rate 1 C/0.1 C (%) | Retention@ 140cycle, 0.5 C/1 C (%) |
|---|---|---|---|---|---|---|---|---|---|---|---|---|
| Example1 | 1.2 | 0.5 | 2.99 | 0.37 | 0.46 | 1.25 | 0.15 | 14.2 | 11.45 | 200 | 90 | 85 |
| Example2 | 1.2 | 0.4 | no data | 0.34 | 0.56 | 1.68 | 0.25 | 14.1 | 11.35 | 201 | 89 | 83 |
| Comparative example1 | 0.0 | 0.0 | 2.99 | 0.66 | 0.29 | 0.44 | 0.19 | 14.9 | 11.42 | 202 | 90 | 79 |
| Comparative example2 | 1.0 | 0.0 | 2.98 | 0.54 | 0.20 | 0.37 | 0.24 | 15.0 | 11.35 | 202 | 90 | 79 |

Thus, it was confirmed that the lithium nickelate-based positive electrode active substance particles according to the present invention were the positive electrode active substance particles each comprising the core particle X comprising a lithium nickelate composite oxide having a layer structure, and the coating compound Y having an average film thickness of 0.2 to 5 nm, which was characterized in that the crystal phase having a layered rock salt structure and comprising $Ni^{2+}$ ions is present in the form of a layer between the core particle X and the coating compound Y. In addition, the resulting secondary battery had not only high battery capacity owing to charging at a high voltage, but also high charge/discharge cycle characteristics, and it was therefore confirmed that the battery was able to exhibit a high performance.

INDUSTRIAL APPLICABILITY

In accordance with the present invention, the coating compound whose average film thickness is in the range of 0.2 to 5 nm and therefore very thin is formed on the positive electrode substance, and the crystal phase having a layered rock salt structure and comprising $Ni^{2+}$ ions is present in the form of a layer therebetween, so that it is possible to provide positive electrode active substance particles comprising a lithium nickelate composite oxide which are excellent in repeated charge/discharge cycle characteristics of the resulting battery upon charging at a high voltage while maintaining a high energy density, as well as a non-aqueous electrolyte secondary battery. The lithium nickelate-based positive electrode active substance particles have an extremely low content of lithium hydroxide as an impurity, and the resulting secondary battery exhibits a long service life and has a high energy density as apparently indicated by the charge/discharge cycle characteristics thereof.

The invention claimed is:

1. Positive electrode active substance particles each comprising:
   a core particle X comprising a lithium nickelate composite oxide having a layer structure which is represented by the formula:

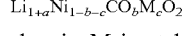
   $Li_{1+a}Ni_{1-b-c}Co_bM_cO_2$ wherein M is at least one element selected from the group consisting of Mn, Al, B, Mg, Ti, Sn, Zn and Zr; a is a number of −0.1 to 0.2; b is a number of 0.05 to 0.5; and c is a number of 0.01 to 0.4; and a coating compound Y comprising at least one element selected from the group consisting of Al, Mg, Zr, Ti and Si, wherein the coating compound Y is in the form of a thin film having an average film thickness of 0.2 to 5 nm, in which a crystal phase having a layered rock salt structure and comprising $Ni^{2+}$ ions is present in the form of a layer between the core particle X and the coating compound Y, wherein the ratio of the crystal phase to the core particle X is in the range of 0.1 mol % to 3.0 mol %, wherein the ratio of $Ni^{2+}/Ni^{3+}$ in the core particle X is lower than the ratio of $Ni^{2+}/Ni^{3+}$ in the positive electrode active substance particles, wherein the ratio of $Ni^{2+}/Ni^{3+}$ is measured by Rietveld method.

2. The positive electrode active substance particles according to claim 1, wherein an average valence of Ni in the positive electrode active substance particles is 2.80 to 3.10.

3. The positive electrode active substance particles according to claim 1, wherein a content of lithium hydroxide LiOH in the positive electrode active substance particles is not more than 0.50% by weight, a content of lithium carbonate $Li_2CO_3$ in the positive electrode active substance particles is not more than 0.65% by weight, and a weight ratio of the content of the lithium carbonate to the content of the lithium hydroxide is not less than 0.9.

4. The positive electrode active substance particles according to claim 1, wherein the positive electrode active substance particles have a BET specific surface area of 0.05 to 0.70 $m^2$/g, a median diameter $D_{50}$ of aggregated particles of 1 to 30 μm, and a 2% powder pH value of not more than 11.6.

5. A non-aqueous electrolyte secondary battery comprising a positive electrode active substance that at least partially comprises the positive electrode active substance particles as claimed in claim 1.

6. The positive electrode active substance particles according to claim 1, wherein the average film thickness of the coating compound Y is 0.2 to 2.0 nm.

7. The positive electrode active substance particles according to claim 1, having a BET specific surface area of 0.05 to 0.5 $m^2$/g.

8. The positive electrode active substance particles according to claim 1, wherein the ratio of the crystal phase to the core particle X is 0.2 mol % to 2.5 mol %.

* * * * *